United States Patent

Krempl et al.

Patent Number: 5,557,968
Date of Patent: Sep. 24, 1996

[54] PIEZOELECTRIC MEASURING ELEMENT FOR MEASURING MECHANICAL VARIABLES

[75] Inventors: Peter W. Krempl, Graz/Ragnitz; Roland Selic, Graz, both of Austria

[73] Assignee: AVL Gesellschaft für Verbrennungskraftmaschinen und Messtechnik m.b.H. Prof. Dr.Dr.h.c. Hans List, Graz, Austria

[21] Appl. No.: 393,390

[22] Filed: Feb. 23, 1995

[30] Foreign Application Priority Data

Mar. 3, 1994 [AT] Austria ................................. A461/94

[51] Int. Cl.⁶ ............................................. H01L 41/08
[52] U.S. Cl. ........................................... 73/497; 310/361
[58] Field of Search .................................. 310/360, 361, 310/315, 346, 338, 357; 73/497

[56] References Cited

U.S. PATENT DOCUMENTS

| | | | |
|---|---|---|---|
| 4,016,437 | 4/1977 | Calderara et al. | 310/8.7 |
| 4,344,010 | 8/1982 | Vig et al. | 310/361 |
| 4,568,850 | 2/1986 | Ballato | 310/361 |
| 4,950,937 | 8/1990 | Ballato et al. | 310/360 |

FOREIGN PATENT DOCUMENTS

| | | |
|---|---|---|
| 278402 | 9/1966 | Austria . |
| 319632 | 12/1974 | Austria . |
| 389170 | 10/1989 | Austria . |

*Primary Examiner*—Hezron E. Williams
*Assistant Examiner*—Richard A. Moller
*Attorney, Agent, or Firm*—Watson Cole Stevens Davis, P.L.L.C.

[57] ABSTRACT

To improve temperature compensation of a piezoelectric element measuring mechanical variables, such as pressure, force, and acceleration, with two or more piezoelectric crystal elements, at least one of the crystal elements differ from the other crystal element(s) either physically or chemically, the positive temperature coefficient of a piezo-coefficient of at least one piezoelectric crystal element compensating the negative temperature coefficient of the other crystal element(s), so that the overall piezoelectric sensitivity of the measuring element will remain essentially constant within a given temperature interval.

5 Claims, 2 Drawing Sheets

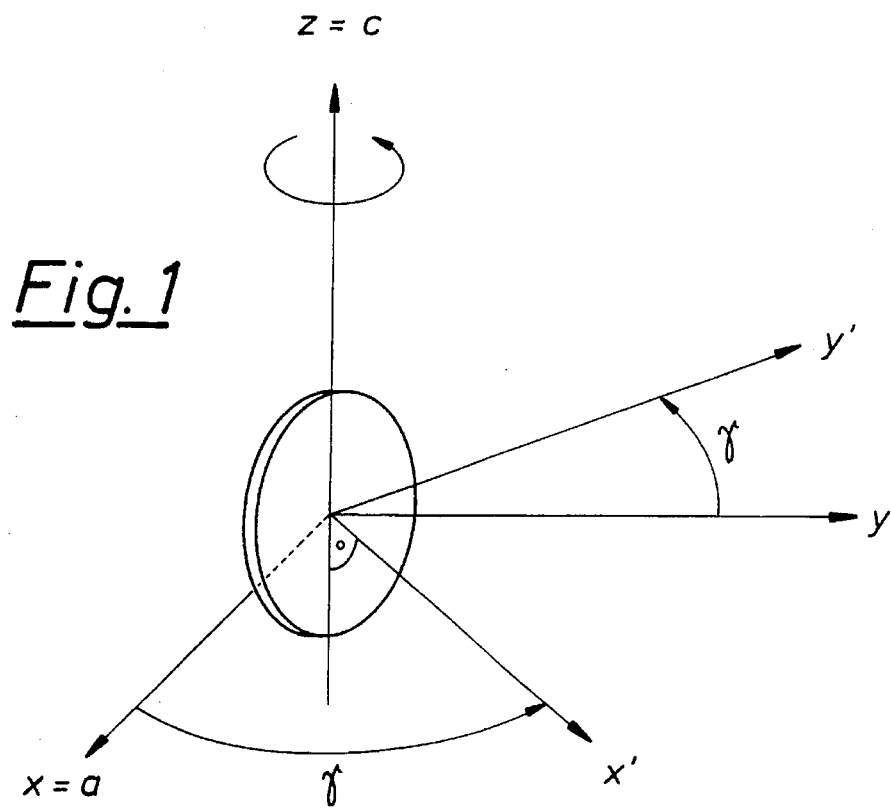
Fig._1
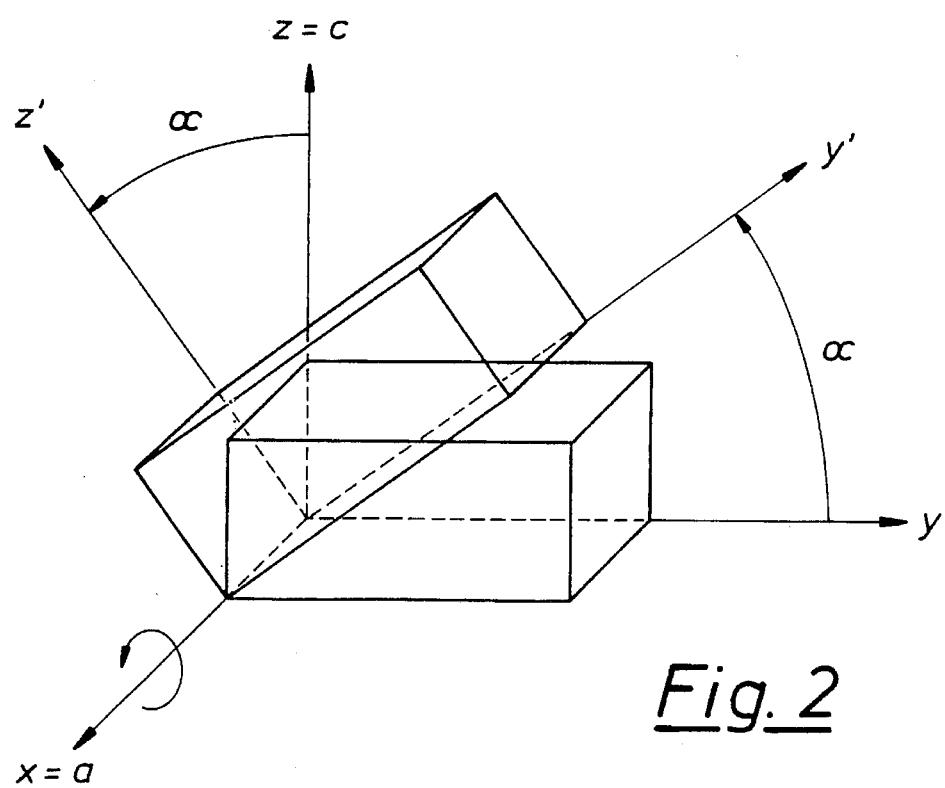
Fig._2

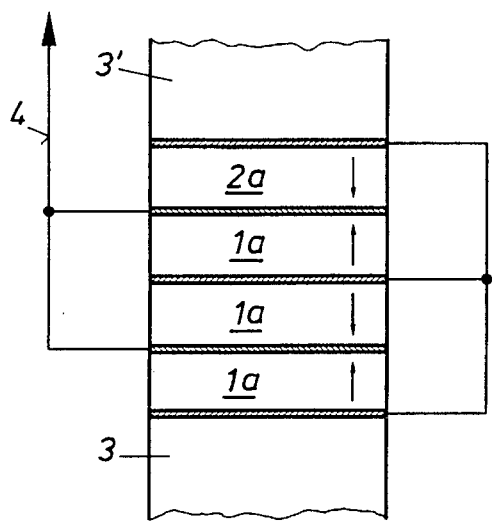
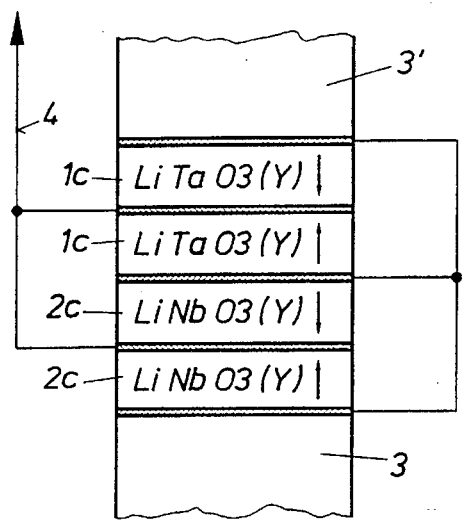
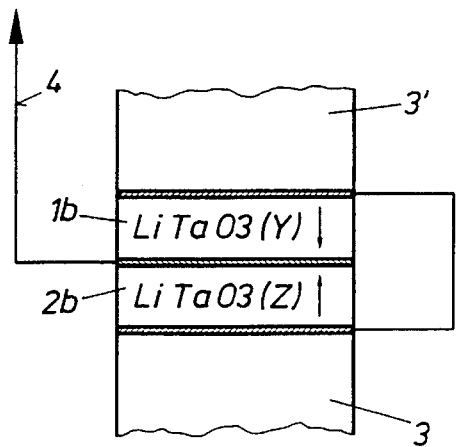
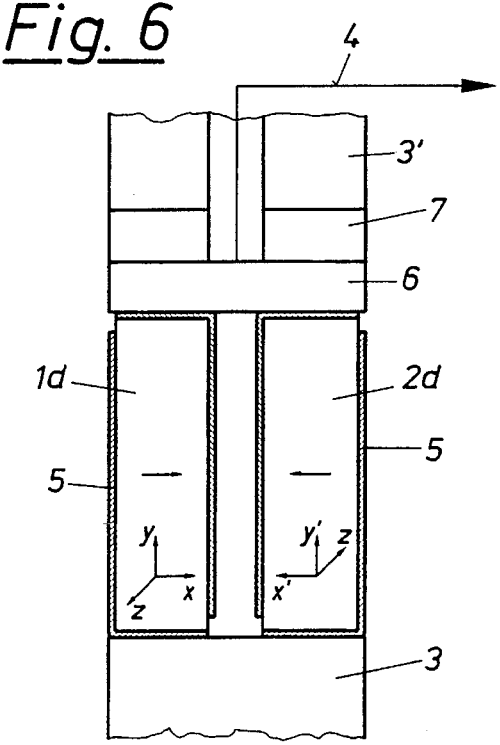

PIEZOELECTRIC MEASURING ELEMENT FOR MEASURING MECHANICAL VARIABLES

BACKGROUND OF THE INVENTION

The invention relates to a piezoelectric measuring element for measurement of mechanical variables, in particular, pressure, force, and acceleration, including at least two piezoelectric crystal elements.

With the steady progress in the development of heat resistant materials for a variety of technical applications, a stable measurement behavior at high temperatures has become of prime importance also in the measurement of physical quantities by means of piezoelectric measuring elements.

Excellent properties, such as high-temperature suitability and stable measurement behavior, have been observed with gallium ortho- phosphate, which belongs to crystallographic point group 32. The disadvantage of gallium orthophosphate is its complicated growth process, which makes this material scarce and excessively expensive.

DESCRIPTION OF THE PRIOR ART

To obtain a stable measurement behavior in quartz, a compensation technique is used, which is described in AT-A 319 632, for example. In that instance the positive temperature coefficient of the piezo-coefficient $d_{14}$ is used for compensation of the negative temperature coefficient of the piezo-coefficient $d_{11}$; in this way a minimum temperature dependence of the transversal coefficient $d_{12}$ is obtained. In order to obtain useful test signals, however, the crystal element must have an oblong shape, which will put a limit on its mechanical load capacity.

Another known technique is described in AT-B 389,170 for the purpose of avoiding shear stresses in a piezoelectric measuring element with two or more crystal elements, where crystal elements made from crystals of point group 32 are used in which there are opposite enantiomorphic types l and r. From AT-PS 278,402 a piezoelectric transducer is known in which the individual crystal elements differ physically due to the use of different cutting directions, leading to different piezo-coefficients.

SUMMARY OF THE INVENTION

It is an object of the invention to obtain a temperature-stable piezoelectric measuring element permitting both an oblong shape and also compact configurations of high mechanical strength, in addition to being cost-effective and easily available.

In the invention this is achieved by providing that at least one of the crystal elements differ either physically or chemically from the other crystal elements, the positive temperature coefficient of a piezo-coefficient of at least one piezoelectric crystal element compensating the negative temperature coefficient of the other crystal element(s), so that the overall piezoelectric sensitivity of the measuring element will remain essentially constant within a given temperature interval. The measuring element is made up of two or more small crystal plates. The number of plates and the material to be used are determined by the absolute values of the effective piezoelectric coefficients, and by the absolute values of the respective temperature coefficients and the desired overall sensitivity.

If the longitudinal piezoeffect is to be utilized, the two or more crystal elements are subject to the variable to be measured in series, i.e., as a stack; if the transversal piezoeffect is to be utilized, the elements are used in parallel.

In a first variant of the invention the crystal elements differ chemically, at least one crystal element with negative temperature coefficient being provided, and at least one crystal element with positive temperature coefficient, the cutting angles and the number of crystal elements being chosen so as to result in an essentially constant overall sensitivity within the given temperature interval. In this context it is provided, for instance, that the at least one crystal element with negative temperature coefficient be made from quartz, and the at least one crystal element with positive temperature coefficient from langasite.

In a second variant the crystal elements are chemically identical, at least one crystal element being provided in a first crystallographic orientation with negative temperature coefficient, and at least one crystal element in a second crystallographic orientation with positive temperature coefficient, the cutting angles and the number of crystal elements being chosen so as to result in an essentially constant overall sensitivity within the given temperature interval.

The crystal elements of this variant are made from lithium tantalate, for example, the crystal element with negative temperature coefficient being a Y-cut and the crystal element with positive temperature coefficient being a Z-cut.

BRIEF DESCRIPTION OF THE DRAWINGS

The invention will be further described by means of examples and with reference to the accompanying drawings, in which FIG. 1 shows a crystal element configured as a small crystal plate, FIG. 2 shows a crystal element in the form of a parallelepiped (block-shaped), and FIGS. 3 to 6 show several variants of the measuring element of the invention, drawn schematically.

DETAILED DESCRIPTION OF PREFERRED EMBODIMENTS

The system of coordinates used for the rotations indicated in the examples below is based on the "IEEE Standard on Piezoelectricity 176-1978", the x-axis coinciding with a crystallographic a-axis, and the z-axis with the optical c-axis.

In a view from above positive rotations are counter-clockwise. With crystal elements configured as circular plates the nomenclature used for rotations is $AB\alpha$, A standing for the direction of the plate's thickness in the initial position, B for the axis along the diameter about which the plate is rotated, and $\alpha$ for the rotation angle in degrees.

FIG. 1 shows an x-longitudinal plate rotated about the z-axis through the angle $\gamma$, with the rotation $XZ\gamma$.

For block-shaped crystal elements such as in Example 4, the nomenclature $ABc\alpha$ is used. The first two letters indicate in turn the directions of thickness and length of the block-shaped element in its initial position. They are followed by the indicators for the direction of the edge about which the crystal element is rotated and the corresponding angle $\alpha$ through which it is rotated.

FIG. 2 shows a transversal element rotated about the x-axis through the angle $\alpha$, with the rotation $XYx\alpha$.

Subsequent rotations refer to the positions of the axes assumed upon previous rotations.

EXAMPLE 1

The measuring element of FIG. 3 is made up of chemically differing crystal elements 1a and 2a, and should have an essentially constant overall piezoelectric sensitivity of greater than 8 pC/N within the temperature interval of 20° to 400° C.

Quartz is used as a material with negative temperature coefficient, and langasite as a material with positive temperature coefficient.

Quartz elements with the rotation YZ20°YX13° preferred in this instance undergo a change of 0.15 pC/N in their longitudinal sensitivity within this temperature interval, i.e., from 1.84 pC/N to 1.69 pC/N. If three quartz crystal elements 1a are used, as is the case in this example, to obtain the desired overall sensitivity, the latter will decrease accordingly, i.e., by 0.45 pC/N. The sensitivity of the fourth crystal element 2a, which is made from langasite, must therefore increase by the same value. This is obtained by using a cut rotated about the y-axis, with a rotation of XY38°, which has a sensitivity of 2.96 pC/N at room temperature.

The overall sensitivity of the measuring element thus amounts to 8.84 pC/N, thereby ensuring that all requirements are fulfilled.

FIG. 3 is a schematical view of the layout and electric connections of such a stack, which is mounted in a housing 3, 3'. As the longitudinal sensitivity is independent of plate thickness the latter may be smaller than 1 mm. The arrows in the individual crystal elements 1a, 2a indicate the direction of polarization, the lead 4 carries off electric charge from the element.

EXAMPLE 2

The measuring element of FIG. 4 comprises two chemically identical crystal elements 1b, 2b, which are cut differently, and should have an essentially constant overall piezoelectric sensitivity of greater than 15 pC/N in the temperature interval of 20° C. to 400° C.

The material with the negative temperature coefficient is a Y-cut of lithium tantalate ($LiTaO_3$), wheras a Z-cut of lithium tantalate is selected as material with positive temperature coefficient.

The lithium tantalate Y-plate (crystal element 1b) undergoes a change in sensitivity of 0.41 pC/N in this temperature interval, i.e., from 8.5 pC/N to 8.09 pC/N. The sensitivity of the lithium tantalate Z-plate (crystal elements 2b) must therefore increase by the same amount. This is achieved by using a Z-cut rotated about the x-axis with the rotation ZX25°, which has a sensitivity of 11.22 pC/N at room temperature.

Overall sensitivity thus amounts to 19.72 pC/N, which ensures that all requirements are fulfilled.

FIG. 4 shows the layout and electric connections of such a stack, which may be smaller than 0.5 mm, as the longitudinal sensitivity is independent of plate thickness.

EXAMPLE 3

The measuring element comprises two chemically different crystal elements 1c and 2c, and should have an essentially constant overall piezoelectric sensitivity of greater than 25 pC/N within the temperature interval of 20° to 400° C.

The material with the negative temperature coefficient is a Y-cut of lithium tantalate ($LiTaO_3$), wheras a Y-cut of lithium niobate ($LiNbO_3$) is selected as material with positive temperature coefficient.

A lithium tantalate Y-plate (crystal element 1c) undergoes a change in sensitivity of 0.41 pC/N in this temperature interval, i.e., from 8.5 pC/N to 8.09 pC/N. If two plates are used to obtain the desired overall sensitivity, as is the case here, overall sensitivity will decrease accordingly, i.e., by 0.82 pC/N. The sensitivity of the other two plates, which are made from lithium niobate (crystal elements 2c), must therefore increase by the same amount. This is achieved by using a cut rotated about the z-axis with the rotation YZ5.5°, which has a sensitivity of 4.83 pC/N at room temperature.

Overall sensitivity of the stack thus amounts to 26.66 pC/N, thereby ensuring that all requirements are fulfilled.

FIG. 5 shows the layout and electric connections of such a stack, which may be smaller than 1 mm.

The combination of cuts shown in Example 3 has the additional advantage that the pyroelectric effect of lithium niobate and tantalate is harmless since it is effective only in z-direction.

In some applications (at low mechanical load) the overall height of the measuring element can be irrelevant. In such instances the compensation method described may also be employed if the transversal effect is utilized.

EXAMPLE 4

The measuring element comprises two chemically differing crystal elements 1d, 2d of rectangular shape, and should have an essentially constant overall piezoelectric sensitivity of greater than 3.5 pC/N within the temperature interval of 20° C. to 400° C.

The material with the negative temperature coefficient chosen in this case is quartz, whereas langasite (lanthanum-gallium-silicate $La_3Ga_5SiO_{14}$) is selected as the material with positive temperature coefficient, load being applied in Y-direction and the electric charge being carried off at the X-faces. Quartz elements 1d undergo a change in transversal sensitivity of 0.19 pC/N in this temperature interval, i.e., from 2.3 pC/N to 2.11 pC/N. The sensitivity of the langasite element 2d must therefore increase by the same amount. This is achieved by using a cut rotated about the z-axis with the rotation XYz26°, which has a sensitivity of 1.25 pC/N at room temperature.

Overall sensitivity thus amounts to 3.55 pC/N, ensuring that all requirements are fulfilled.

FIG. 6 shows the layout and electric connections of such a measuring element comprising two parts.

The crystal elements 1d and 2d have an electrically conductive layer 5. Between the upper part 3' of the housing and an electrode 6 in contact with the crystal elements is provided an insulator 7. As in the previous examples the lead 4 is used to carry off the electric charge from the element.

We claim:

1. Piezoelectric measuring element for measuring mechanical variables such as pressure, force, and acceleration, comprising at least two piezoelectric crystal elements, wherein said crystal elements differ chemically, at least one of said crystal elements having a piezo-coefficient with a negative temperature coefficient, and at least one of said crystal elements having a piezo-coefficient with a positive temperature coefficient, the cutting angles and the number of crystal elements being chosen so as to result in an essentially constant overall sensitivity within a given temperature interval.

2. Measuring element according to claim 1, wherein said at least one crystal element with negative temperature coefficient is made from quartz, and said at least one crystal element with positive temperature coefficient is made from langasite ($La_3Ga_5SiO_{14}$).

3. Measuring element according to claim 1, wherein said at least one crystal element with negative temperature coefficient is made from lithium tantalate ($LiTaO_3$), and said at least one crystal element with positive temperature coefficient is made from lithium niobate ($LiNbO_3$).

4. Piezoelectric measuring element for measuring mechanical variables such as pressure, force, and acceleration, comprising at least two piezoelectric crystal elements, wherein said crystal elements are chemically identical, at least one of said crystal elements having a first crystallographic orientation with negative temperature coefficient of a piezo-coefficient, and at least one of said crystal elements having a second crystallographic orientation with positive temperature coefficient of a piezo-coefficient, the cutting angles and the number of crystal elements being chosen so as to result in an essentially constant overall sensitivity within a given temperature interval.

5. Measuring element according to claim 4, wherein said crystal elements are made from lithium tantalate, said crystal element with negative temperature coefficient being a Y-cut and said crystal element with positive temperature coefficient being a Z-cut.

\* \* \* \* \*